Sept. 26, 1933.                R. B. M. BENNETT                   1,927,913
           DEVICE FOR COVERING MANUALLY CONTROLLABLE PARTS OF MOTOR VEHICLES
                              Filed Dec. 27, 1932
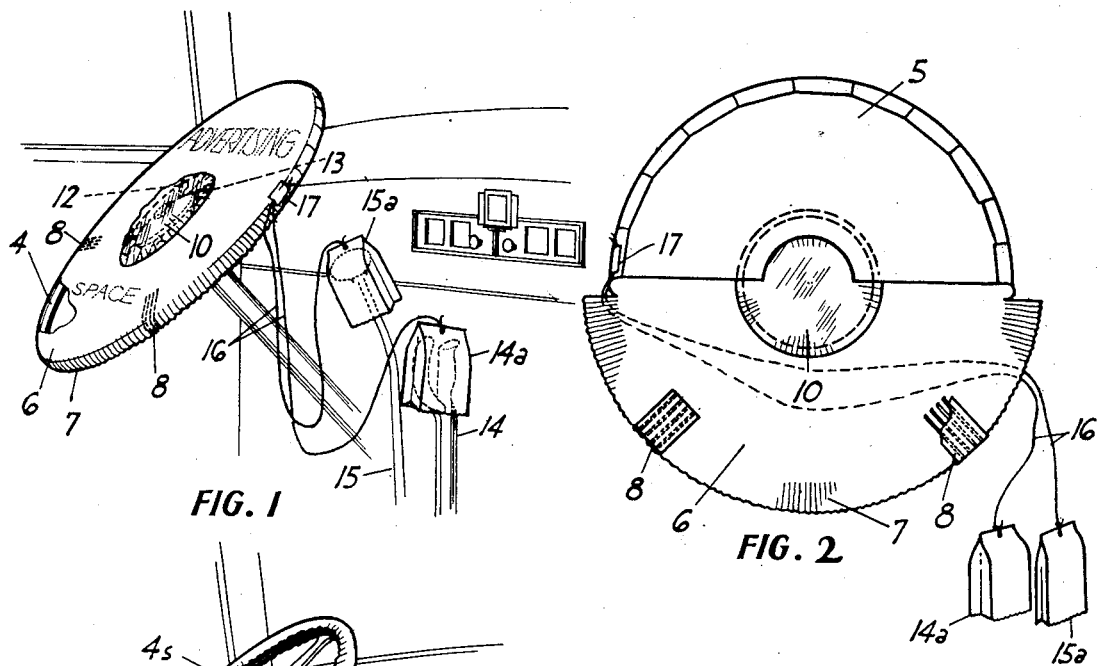
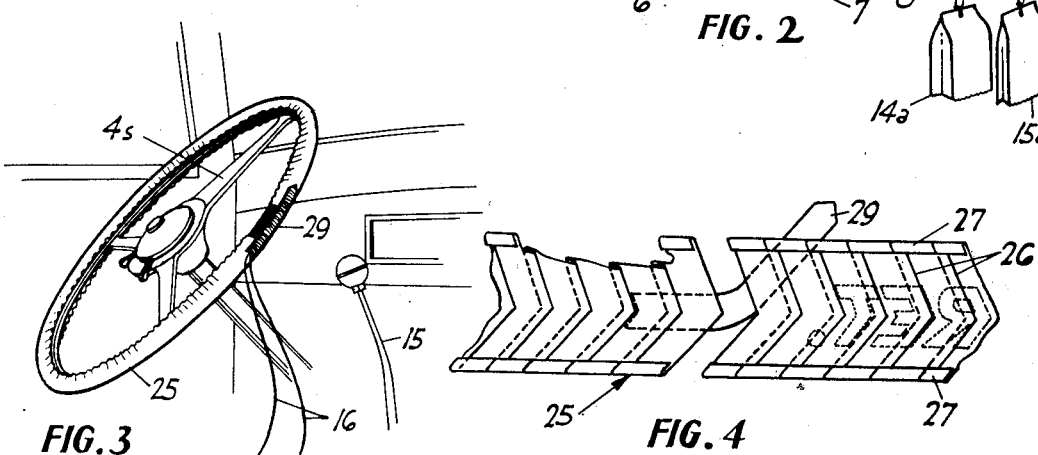
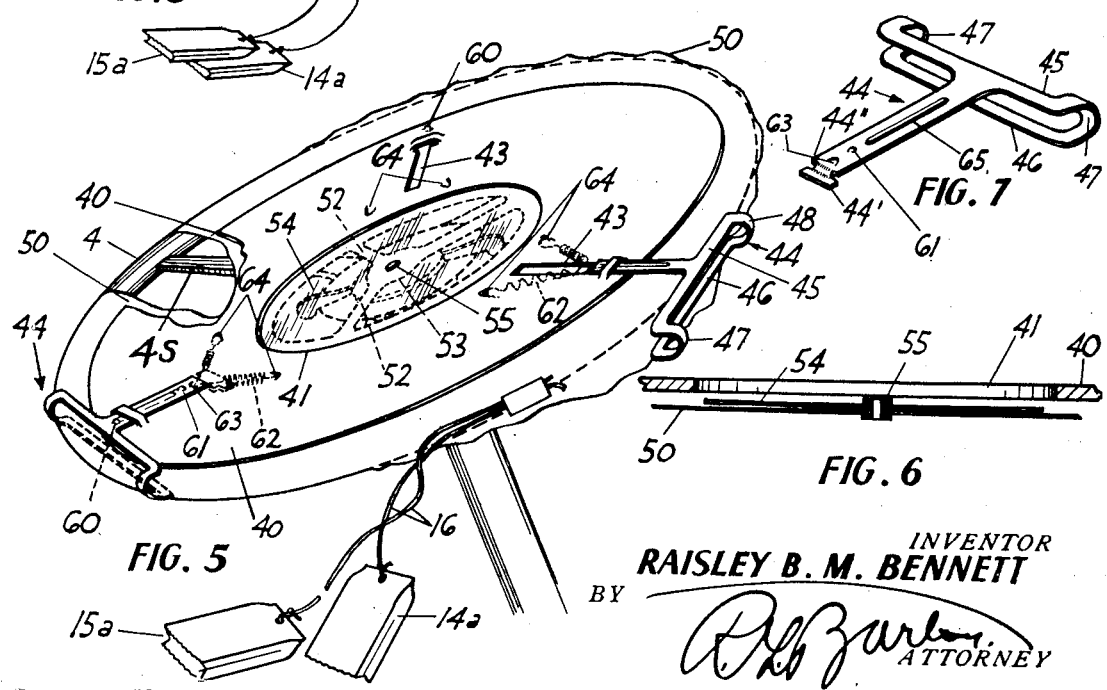
INVENTOR
RAISLEY B. M. BENNETT Patented Sept. 26, 1933

1,927,913

UNITED STATES PATENT OFFICE 1,927,913

DEVICE FOR COVERING MANUALLY CONTROLLABLE PARTS OF MOTOR VEHICLES

Raisley B. M. Bennett, La Jolla, Calif.

Application December 27, 1932
Serial No. 648,963

5 Claims. (Cl. 74—33)

This invention relates to cover devices for covering the steering wheels and other manually controllable parts of motor vehicles.

When a motor vehicle is taken to a garage or repair shop the steering wheel is often soiled by the contact therewith of the greasy, dirty hands of the persons or person who repair the vehicle. Hence when the vehicle is removed from the garage the grease or other grimy substances which have been left upon the wheel or lever handles are apt to be taken up or transferred to the hands or clothing of the driver. This is particularly annoying to lady drivers who are especially desirous of keeping their hands and garments in an unsoiled, neat-appearing condition.

This invention is designed to provide improved means for overcoming these objections by the provision of suitable temporary protective coverings for the steering wheel and lever handles of the vehicle.

Another object of the invention is to provide a satisfactory covering for the steering wheel of the vehicle which will prevent the same from being soiled in the manner above indicated, such covering material being of such an inexpensive character that it may be discarded as soon as it has been used for the desired purpose. In this connection a novel and improved reinforcing or stiffening means is provided to keep the thin, inexpensive paper or other covering material employed in place upon the steering wheel while said material is in use to perform its protective function.

It is an object of the invention not only to provide for keeping the rim portion of the steering wheel from being soiled by the workmen, but also to provide a protective covering for the spark-control and throttling levers usually located near the center of the rim of the steering wheel. The protector for these levers is of a character which does not interfere with their proper manual operation.

Referring to the accompanying drawing, which illustrates what are at present deemed to be preferred embodiments of the invention, Fig. 1 is a perspective view of one form of the invention showing as much of the steering mechanism and of parts adjacent thereto as is necessary to illustrate the use of the invention.

Fig. 2 is a bottom plan view the cover supplied by the invention being shown separately from the steering wheel. This view also illustrates the form of the invention shown in Fig. 1.

Fig. 3 is a perspective view of a steering wheel showing a different form of the invention applied thereto.

Fig. 4 is an enlarged fragmentary detail, in perspective, of a part of the structure shown in Fig. 3.

Fig. 5 is a perspective view showing another form of the invention attached to a steering wheel.

Fig. 6 is an enlarged fragmental section of the central portion of the structure shown in Fig. 5.

Fig. 7 is a perspective detail of one of the adjustable clamps shown in Fig. 5.

Referring in detail to the drawing, the steering wheel cover provided by the preferred embodiment of the invention shown applied to the steering wheel 4, consists of a semi-circular envelope or pocket portion 5 with which is combined as a part thereof and desirably integral therewith, a semi-circular extension or apron 6. The apron 6 is provided along its curved side with a crimped marginal portion 7, it being understood that in the embodiment of the invention which is being described, the cover portions 5 and 6 are preferably both formed principally of a heavy paper. Across the marginal portion 7 of the apron 6 there are shown two groups of radially disposed soft copper wires 8 which are of a readily bendable character thus making it convenient to bend down the marginal portion of the apron as shown in Fig. 1 together with the wires 8, in this manner completing the attachment of the cover to the steering wheel. It is to be understood that the envelope portion 5 is closed along its curved side but is open across its straight side, and that the pocket thus provided is used to house the upper half of the steering wheel, whereupon the marginal portion 7 and wires 8 are bent down around the rim of the steering wheel to form the attached structure shown in Fig. 1.

The central portion of the complete cover is cut away to provide an opening over which is placed and to the margin of which is attached the transparent cellophane sheet 10. Said cellophane sheet is of a tenacious character, but is quite flexible and hence does not interfere with the operation of the spark control lever 12 and throttle lever 13. In order to facilitate the operation of these levers through the cellophane it is applied to the main portion of the cover in a somewhat convex or dome shaped form.

In order to provide for protecting the handle portions of the brake lever 14 and gear shift lever 15, the paper hoods 14a and 15a are provided, these hoods being secured to the marginal portion of the main cover member by means of the cords 16. These cords have their lower ends attached to the closed ends of the hoods. The other ends of said cords may be attached to the main cover member in any convenient manner as by means of the paper or cloth tab 17.

Describing next the form of the invention shown in Figs. 3 and 4, the rim of the steering wheel has applied thereto a cover strip 25, said cover strip being shown in detail in Fig. 4. This cover strip may be made of paper and is sufficient in length to extend around the rim of the steering wheel. Said cover strip is provided with a series of transversely extending pleats 26, and with a folded over portion or hem 27 at each long edge thereof. These edge folds are directed toward the center of the rim when the strip is applied thereto, the pleats 26 at such time permitting the central or mid-width portion of the strip to lengthen and bulge outwardly. Hence the strip may be well fitted to the wheel rim as shown in Fig. 3.

In order to complete the attachment of the strip to the steering wheel a tongue or strip of adhesive material 29 is attached to one end of strip 25, preferably at its midwidth, in order that the free end of said tongue may be adhered to the other end of the strip after the strip has been put in place upon the steering wheel as shown in Fig. 3. Preferably the face of the strip 25 toward which the folds 27 are directed will be placed against the outer side of the wheel rim as the strip is being applied to the wheel, and then each edge portion of the strip will be unfolded and crimped down around the wheel rim as indicated in the drawing, the final step in attaching the strip to the wheel being gumming down the free end of the tongue 29.

In the third form of the invention shown, a circular plate 40, desirably of sheet metal or the like, is provided to cover the spoke portion of the steering wheel, said plate having a central aperture 41 to provide an unobstructed space for operating the sparking and throttle levers. This plate is shown provided with three radially extending slots 43, each of these slots forming a guide for the stem portion of a T-shaped member 44, these T-shaped members cooperating to detachably secure the plate 40 to the steering wheel upon which it is mounted. Said T-shaped members are desirably each formed of a strip of sheet metal which is bent in such a manner as to provide the head of the T with two limbs or arms 45 and 46, these arms being in spaced relation to each other to provide room to receive the rim of the wheel between them.

The extremities of these arms are shown united by an outwardly directed bend or convexity 47 in the strip thereby providing a deeper seat to receive the wheel rim.

The stems of the T-members are each provided with a longitudinally extending struck-up portion, so as to form a groove 65 on the underside thereof, and there is a boss 60 struck-up on the cover plate 40 with which said groove cooperates, while the T-members are being extended and retracted against the opposition of the springs 62, said springs having one of their ends fastened to the clip 63 formed by stamping said T-member, and the other end of each spring being fastened to the ears or clips 64 which are formed by stamping the metal cover 40, there being a socket 61 formed in each T-member adjacent the inner end of said groove 65 in which said boss 60 seats when the T-members are fully extended, whereby to maintain the T-members in their fully extended position incident to the application of the cover to the wheel. The T-members also have inner heads 44' provided with offset necks 44" which cooperate with the edges of the guide slots 43.

An annular cover member 50 of paper or other sheet material cooperates with the cover plate 40 of Fig. 5. This cover member 50 is sufficiently large to permit its peripheral portion 51 to be crimped around the wheel rim as indicated in Fig. 5. At the center of said member 50 it is provided with spokes or spider arms 52 spaced to overlie the spokes 4s of the steering wheel 4 when the cover structure is in its operative position, said spokes of the cover being united by a central or hub portion 53.

Upon the hub portion 53 is rotatably mounted a cellophane disc 54 by means of an open ended rivet 55. This rotatable transparent disc affords a convenient means for protecting from being soiled the central portion of the steering wheel, together with the throttle lever and spark control lever; while allowing satisfactory manual operation of said levers.

The cover member 50 and the sheet metal cover member 40 are applied simultaneously to the steering wheel, the clamps 44 being first set in their extended position. It may be found desirable to discard the cover portion 50 after it has been used once or twice, but the sheet metal portion of the cover structure may be repeatedly used.

In all the forms of the invention the hoods 14a and 15a are shown attached to the peripheral portion of the paper covers employed.

In applying to the steering wheel the form of the invention shown in Figs. 1 and 2, the envelope portion of the cover is first fitted around one side of the steering wheel.

Then the marginal portion of the lower half of the cover is crimped or curled around the adjacent portion of the rim. By grasping the wire segments or section 8 of the cover, in applying said cover, the workman's hands will be in position to bend the wires therein into gripping position at the same time that he brings the cover into its applied position. Also in removing the cover these wired sections should be grasped first in order that they may be loosened from the rim of the wheel thus preparing the way for removing the envelope portion 5 of the cover.

In applying to the steering wheel the form of cover shown in Figs. 3 and 4, the cover 25 will be unfolded from the compact condition in which it will be kept for use and will then be stretched out along its mid-width, the pleats 26 unfolding to permit this and at the same time causing the cover to assume a C-shaped form by reason of the fact that the marginal folds 27 cause the edge portions of the strip to resist elongation. The concave side of the mid-width portion of the strip will then be directed toward the outer side of the periphery of the rim of the steering wheel, whereupon the cover may be fitted over the wheel as shown in Fig. 1, the final act of securing it in place being to fasten down the gummed free end of the tongue 29.

In applying to the steering wheel the cover construction shown in Figs. 5, 6 and 7, the metal plate 40, together with the cover member 50 on the under face thereof, are put into the position shown, the T-shaped members 44 having first been sufficiently extended to prevent their heads from interfering with bringing the metal disc 40 down into place.

Thereupon the T-shaped members 44 are forced inwardly disengaging the sockets 61 from the bosses 60, whereupon thru the medium of the springs 62 said T-members are retracted to the wheel-rim gripping position wherein they also grip and hold in place the peripheral portion of the flexible covering 50, which has been crimped down under the wheel rim during the retraction of the T-members.

In applying all the forms of the invention the lever covers 14a and 15a are preferably placed over the lever handles which they cover, as a final act in preparing the cover structures for use.

I claim:

1. A steering wheel cover comprising a semicircular envelope portion adapted to fit over a segmental part of a steering wheel, and a semicircular apron portion having a bendable margin adapted to grip a portion of the steering wheel outside of the part thereof to be included in said envelope portion.

2. A steering wheel cover comprising a segmental envelope portion adapted to fit over a part of the steering wheel, and a segmental apron portion having a bendable marginal portion to grip a portion of the steering wheel outside of the part thereof to be included in said envelope portion, said marginal portion having flexible wires mounted thereon to aid in maintaining it in a bent condition for gripping the steering wheel.

3. A steering wheel cover having an apertured central portion, and a sheet of transparent flexible material covering said apertured portion to afford access to and operation of levers located in axial alinement with the steering wheel shaft.

4. The substance of claim 3 and, said transparent flexible material being of a bulged character.

5. A steering wheel cover having an apertured central portion, and a sheet of cellophane covering said apertured portion to afford access to and operation of levers located in axial alinement with the steering wheel shaft.

RAISLEY B. M. BENNETT.